(12) United States Patent
Clark et al.

(10) Patent No.: US 8,489,919 B2
(45) Date of Patent: Jul. 16, 2013

(54) CIRCUITS AND METHODS FOR PROCESSORS WITH MULTIPLE REDUNDANCY TECHNIQUES FOR MITIGATING RADIATION ERRORS

(75) Inventors: Lawrence T. Clark, Phoenix, AZ (US); Dan W. Patterson, Scottsdale, AZ (US)

(73) Assignee: Arizona Board of Regents, Scottsdale, AZ (US)

( * ) Notice: Subject to any disclaimer, the term of this patent is extended or adjusted under 35 U.S.C. 154(b) by 775 days.

(21) Appl. No.: 12/626,495

(22) Filed: Nov. 25, 2009

(65) Prior Publication Data

US 2010/0268987 A1 Oct. 21, 2010

Related U.S. Application Data

(60) Provisional application No. 61/118,364, filed on Nov. 26, 2008, provisional application No. 61/118,360, filed on Nov. 26, 2008, provisional application No. 61/118,337, filed on Nov. 26, 2008, provisional application No. 61/118,351, filed on Nov. 26, 2008.

(51) Int. Cl.
G06F 11/00 (2006.01)
(52) U.S. Cl.
USPC .................................. 714/11; 714/10; 714/2
(58) Field of Classification Search
USPC ................................................ 714/11, 10, 2
See application file for complete search history.

(56) References Cited

U.S. PATENT DOCUMENTS

| | | | |
|---|---|---|---|
| 5,347,648 A * | 9/1994 | Stamm et al. | 714/5.11 |
| 5,870,341 A | 2/1999 | Lin et al. | |
| 5,983,370 A * | 11/1999 | Anderson | 714/49 |
| 6,381,622 B1 * | 4/2002 | Lie | 708/211 |
| 6,701,484 B1 | 3/2004 | Jordan et al. | |
| 6,838,899 B2 | 1/2005 | Plants | |
| 6,901,532 B2 | 5/2005 | DeRuiter et al. | |
| 6,901,540 B1 * | 5/2005 | Griffith et al. | 714/48 |
| 6,990,010 B1 | 1/2006 | Plants | |
| 7,036,059 B1 | 4/2006 | Carmichael et al. | |
| 7,047,440 B1 * | 5/2006 | Freydel et al. | 714/11 |
| 7,221,607 B1 | 5/2007 | Vernenker et al. | |
| 7,257,763 B1 | 8/2007 | Srinivasan et al. | |
| 8,037,356 B2 * | 10/2011 | Rasmussen et al. | 714/31 |
| 8,112,678 B1 | 2/2012 | Lewis et al. | |
| 8,122,317 B1 | 2/2012 | Clark et al. | |
| 8,301,992 B2 | 10/2012 | Bybell et al. | |
| 2003/0061523 A1 * | 3/2003 | Stanley | 713/300 |
| 2004/0007743 A1 | 1/2004 | Matsuda et al. | |
| 2004/0103267 A1 * | 5/2004 | Takata | 712/225 |
| 2005/0021925 A1 | 1/2005 | Clark et al. | |
| 2005/0024928 A1 | 2/2005 | Cummings et al. | |
| 2006/0153068 A1 * | 7/2006 | Dally et al. | 370/219 |
| 2007/0162798 A1 | 7/2007 | Das et al. | |

(Continued)

OTHER PUBLICATIONS

An Area and Power Efficient Radiation Hardened by Design Flip-Flop; Jonathan E. Knudsen, and Lawrence T. Clark; IEEE Transactions on Nuclear Science, vol. 53, No. 6, Dec. 2006; pp. 3392-3399.

(Continued)

*Primary Examiner* — Sarai Butler

(74) *Attorney, Agent, or Firm* — Withrow & Terranova, P.L.L.C.

(57) ABSTRACT

Embodiments of circuits for processors with multiple redundancy techniques for mitigating radiation errors are described herein. Other embodiments and related methods and examples are also described herein.

39 Claims, 8 Drawing Sheets

U.S. PATENT DOCUMENTS

| | | | |
|---|---|---|---|
| 2007/0260939 A1* | 11/2007 | Kammann et al. | 714/48 |
| 2008/0250227 A1* | 10/2008 | Linderman et al. | 712/32 |
| 2009/0006905 A1 | 1/2009 | Luick | |
| 2009/0031163 A1 | 1/2009 | Rashed et al. | |
| 2009/0089642 A1* | 4/2009 | Miles et al. | 714/752 |
| 2009/0183035 A1* | 7/2009 | Butler et al. | 714/48 |

OTHER PUBLICATIONS

Reducing Radiation-Hardened Digital Circuit Power Consumption; John K. McIver III, and Lawrence T. Clark; IEEE Transactions on Nuclear Science, vol. 52, No. 6, Dec. 2005; pp. 2503-2509.

A 130-nm RHBD SRAM With High Speed SET and Area Efficient TID Mitigation; Karl C. Mohr, Lawrence T. Clark, and Keith E. Holbert; IEEE Transactions on Nuclear Science, vol. 54, No. 6, Dec. 2007; pp. 2092-2099.

Notice of Allowance for U.S. Appl. No. 12/626,479 mailed Sep. 6, 2012, 8 pages.

Non-final Office Action for U.S. Appl. No. 12/626,479 mailed May 23, 2012, 17 pages.

Non-final Office Action for U.S. Appl. No. 12/626,488 mailed Apr. 26, 2012, 15 pages.

Notice of Allowance for U.S. Appl. No. 12/626,488 mailed Nov. 23, 2012, 6 pages.

Notice of Allowance for U.S. Appl. No. 12/626,479 mailed Jan. 7, 2013, 9 pages.

* cited by examiner

CIRCUITS AND METHODS FOR PROCESSORS WITH MULTIPLE REDUNDANCY TECHNIQUES FOR MITIGATING RADIATION ERRORS

CROSS REFERENCE TO RELATED APPLICATIONS

This application claims priority to:
U.S. Provisional Patent Application 61/118,364, filed on Nov. 26, 2008;
U.S. Provisional Patent Application 61/118,360, filed on Nov. 26, 2008;
U.S. Provisional Patent Application 61/118,337, filed on Nov. 26, 2008; and
U.S. Provisional Patent Application 61/118,351, filed on Nov. 26, 2008.
The disclosure of each of the applications above is incorporated herein by reference.

GOVERNMENT FUNDING

The disclosure herein was funded with government support under grant number FA-945307-C-0186, awarded by the Air Force Research Laboratory. The United States Government may have certain rights in this application.

TECHNICAL FIELD

This disclosure relates to complementary metal-oxide-semiconductor devices and circuits, and more specifically, techniques and designs to harden the electrical response and performance of devices and circuits against radiation-induced effects.

BACKGROUND

Space instrumentation has to operate in hazardous high-radiation environments. Depending on a particular mission this may encompass solar and cosmic radiation as well as trapped high energy electron & proton belts in the vicinity of planetary bodies. The inability to replace hardware failures on satellites means very rigorous instrument design and component selection is needed to ensure reliability during the mission timeline. Semiconductor circuits and devices, including complementary metal-oxide-semiconductor (CMOS) devices are often part of systems and devices used in such harsh environments. Other harsh environments include high altitude flight, nuclear power stations and battlegrounds. However, semiconductors are prone to damage from radiation. This is due to the very nature of semiconductors—typically small band gap materials operating with limited numbers of charge carriers. The effect of radiation in semiconductors is a complicated subject but generally speaking three effects can be identified:

1. Displacement Damage is cumulative long-term non-ionizing damage due to high energy particles. The impact of a high energy particle can create vacancy sites where recombination can occur. This can reduce the device performance and may eventually result in a non operation.
2. Short-term effects, such as single Event Effects (SEEs) (e.g. a Single Event Upset (SEU) or a single event transient (SET)): this can cause a bit flip (i.e. change in logic state) in an integrated circuit, thereby causing a loss of information. The severity of this effect depends on the type of SEE. Another short-term effect, the dose ray effect, is caused by exposure of an entire integrated circuit to a flood of radiation, such as x-rays. This effect is typically related to short bursts (typically of the order of nanoseconds to milliseconds) of radiation, which can cause temporary, and in some cases permanent, failure of integrated circuits.
3. Total ionization damage where the impact of high energy particles results in electron-hole pair creation. In the case of powered metal-oxide-semiconductor field effect transistors (MOSFETs), electron diffusion can enhance conduction which can lead to permanent turn-on & associated high current consumption (known as 'latch up') resulting in device burn out and potential damage elsewhere. A cumulative measure of the damage is the Total Ionizing Dose (TID). Accumulation of radiation dose can trap charge carriers within semiconductor devices, for example, trapping generated charge in insulating $SiO_2$ regions of a device. This can cause shifts of the threshold voltage, leakage currents, timing skew and lead to permanent, functional failures of the circuit.

Radiation hardening by design (RHBD) employs layout and circuit techniques to mitigate TID and single-event effects, including single-event latchup (SEL). As mentioned above, a primary TID effect is positive charge accumulation in isolation oxides, shifting the threshold voltages of devices associated with the circuit, including parasitic devices. Transistor layouts that provide TID and SEL hardness are typically larger than the conventional two-edge transistors used for non-hardened ICs and increase active power as well as leakage over a non-hardened design. NMOS transistors are usually the most sensitive part of CMOS circuits to total dose effects, and efforts have been made to harden CMOS devices and circuits against total dose effects. Many techniques add further complex processing steps to the manufacturing process. Furthermore, the use of error detection and correction techniques can result in larger circuit sizes and slower performance of semiconductor circuits. Triple redundancy techniques or temporal sampling based design usually result in higher power and/or lower performance (e.g. slow clock rates).

It would be highly advantageous, therefore, to remedy the foregoing and other deficiencies inherent in the prior art.

Figure 1:
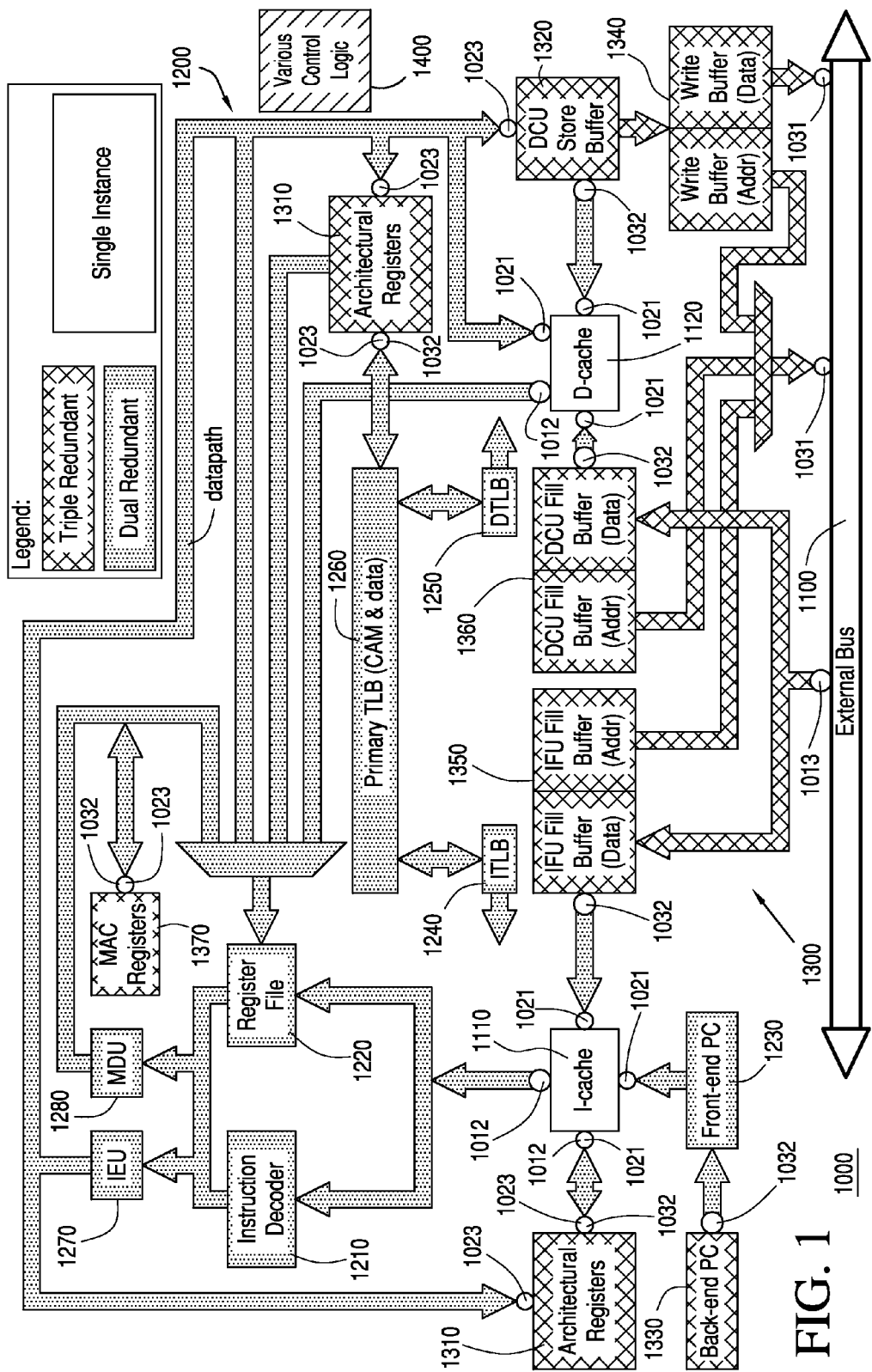
FIG. 1 shows a block diagram of a processor in accordance with the present disclosure.

For simplicity and clarity of illustration, the drawing figures illustrate the general manner of construction, and descriptions and details of well known features and techniques may be omitted to avoid unnecessarily obscuring of the drawings. Additionally, elements in the drawing figures are not necessarily drawn to scale. For example, the dimensions of some of the elements in the figures may be exaggerated relative to other elements to help improve understanding of different embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the present disclosure are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments and methods described herein are, for example, capable of operation in orientations other than those illustrated or otherwise described herein.

The terms "couple," "coupled," "couples," "coupling," and the like should be broadly understood and refer to connecting two or more elements, electrically, mechanically, and/or otherwise, either directly or indirectly through intervening elements. Coupling may be for any length of time, e.g., permanent or semi-permanent or only for an instant. The absence of the word "removably," "removable," and the like near the word "coupled," and the like does not mean that the coupling, etc. in question is or is not removable.

DETAILED DESCRIPTION

Protecting high performance microprocessor circuits from ionizing radiation induced upset is a key issue in the design of microcircuits for spacecraft. The disclosure herein provides a number of techniques to comprehensively detect and correct soft errors in a high performance microprocessor. A soft error is an error occurrence in a computer system that changes an instruction in a program or a data value. Soft errors can occur at the chip-level and at the system level. A chip-level soft error can occur when a charged particle (e.g. caused by ionizing radiation) hits a memory cell and causes the cell to change state to a different value. This does not damage the actual structure of the chip. A system-level soft error can occur when the data being processed is hit with a noise phenomenon, typically when the data is on a data bus. The computer tries to interpret the noise as a data bit, which can cause errors in addressing or processing program code. The bad data bit can even be saved in memory and cause problems at a later time. Besides providing radiation hardening, another goal of these techniques is to minimize performance degradation, power consumption, and silicon area, relative to an equivalent unhardened microprocessor, i.e., that does not have these radiation hardening features. One of such techniques is the use of dual redundant instruction execution pipelines whereby two identical instances of the pipeline operate in lockstep, with the results produced by each pipeline compared to each other in order to detect mismatches due to radiation induced errors, whether due to SET or SEU. When such an error is detected, the pipelines are flushed and the instructions that were in-flight are restarted. The correct operation of the microprocessor requires preventing the architectural state of the machine from being corrupted by soft errors. Various techniques are used to recover from or prevent architectural state corruption, depending on the specific architectural state affected, e.g., caches, register files, or system registers.

This disclosure relates to a radiation hardened by design (RHBD) microprocessor, where radiation hardening is achieved by the micro-architecture, circuit, and physical design of the processor. Radiation hardening increases the immunity of a semiconductor device to radiation induced errors.

A radiation induced error occurs in a semiconductor device when a high-energy particle travels through the semiconductor, leaving an ionized track behind. This ionization may cause a glitch in the output of a circuit (referred to as a Single Event Transient (SET)), or may cause a bit to flip to the opposite state in memory or a register (referred to as a Single Event Upset (SEU)). This does not cause physical damage to the device, but may cause a malfunction if the device is not able to recover from the error. Such errors are considered "soft errors". When a radiation induced error occurs, it affects a relatively small area of the semiconductor device. Typically, only a handful of nodes in the circuit in a small area are impacted. This leads to various techniques that can be used for dealing with such errors, depending on where in the processor the error occurs.

In one embodiment, most design elements within the processor's instruction execution pipeline are dual redundant. In other words, each instance of a dual redundant design element has an exact copy that performs the same function, at the same time, as the original. As each design element operates, its logical state is compared with that of its dual redundant counterpart. To minimize the hardware overhead, this checking is performed between dual redundant state elements in each pipeline stage, such as latches and flip-flops. When a mismatch is detected (due to a radiation induced error), the pipeline is flushed, and the operations that were in flight in the pipeline are restarted.

There can also be other embodiments that only perform dual redundant mismatch checking at the boundary between the speculative and architectural states in the machine. This further simplifies and minimizes the additional hardware required for detecting and correcting such errors. However, in this embodiment, the pipeline flush that occurs when a dual redundant mismatch is detected includes the instruction that was being retired at the time, since this instruction may have just updated the architectural state with corrupted data. As a result, this embodiment includes a mechanism to back out of this corrupted state and to restore the previous non-corrupted state.

In another embodiment, some of the design elements within the processor's instruction execution pipeline are dual redundant while others only have a single instance. The latter design elements utilize other techniques, e.g. error-correcting codes (ECC) or parity protection, to detect errors, and when an error is detected in these elements, the pipeline is flushed and the operations that were in flight in the pipeline are restarted, as before. For a small portion of the design in both embodiments, triple redundancy is used in certain control logic and architectural state where recovering from radiation induced errors would be significantly more complex if using other methods. Triple redundant circuits implement three identical copies of each design instance, and the response from all three instances is compared as the machine operates. When one instance mismatches with the other two, the majority response is taken as the correct one. This allows one instance to be corrupted by a SEE without causing a circuit malfunction. The triple redundant circuits may allow for the circuit to self-correct, i.e., to automatically update the state of upset versions without external intervention.

This approach to radiation hardening allows all of the design techniques used in mainstream high performance custom designs to be utilized, particularly dynamic logic, thus allowing high levels of performance to be achieved. This is accomplished with less area overhead than the traditional full triple redundant approach often used in radiation hardened circuits, and with no frequency degradation, unlike designs that use temporal latch techniques (spacing in time) to detect and correct radiation induced errors. This approach also has the benefit of being able to detect and correct radiation induced errors that take longer than a clock cycle to dissipate. The latter is achieved by waiting a pre-determined amount of time, i.e., that deemed sufficient for the charge deposited by the radiation event to dissipate, before restarting the pipeline. Such approaches allow the circuits described herein to operate at faster rates than traditional RHBD circuits. In some examples, the circuits or processors described herein can be configured to operate at an operating speed of at least approximately 250 megahertz, and/or of at least approximately 300 megahertz. There can be other examples configured to handle even faster operating speeds, such as an operating speed of at least approximately 1 gigahertz.

The description that follows is based on two assumptions:
1. When a soft error occurs, it will affect a relatively small region of the chip, causing at most only a few neighboring nodes to flip to an erroneous value. Circuits that must not be corrupted when a neighboring circuit is corrupted are thus spaced sufficiently far apart such that a radiation induced error will affect at most one of the two circuits. Dual and triple redundant circuits follow this spacing requirement. The latter are spaced such that at most one of the three triple redundant circuits is affected by a soft error.
2. When a soft error occurs, it will not be followed by another soft error for many processor clock cycles. This assumption essentially means that when an error occurs, there is sufficient time to recover from the error before another error occurs.

The above assumptions are based on real-world measurements in space based radiation environments, and should even be met in a particle beam from a cyclotron or other such apparatus.

In order to describe various radiation hardening techniques for processors, an exemplary embodiment will be used throughout this document by way of example only. However, these techniques are by no means limited to such embodiment. The latter is simply used to facilitate the description. Those skilled in the art should easily recognize how these techniques could be used in other embodiments. A block diagram of one embodiment of RHBD processor 1000 is shown in FIG. 1. In some examples, processor 1000 can comprise a digital signal processor, a microcontroller, and/or a microprocessor. This design is based on a Reduced Instruction Set Computing (RISC) load/store architecture with delayed branches. A single branch delay slot is supported, i.e., the instruction that sequentially follows a jump/branch instruction in memory will always be executed, regardless of whether the branch is taken or not. As a result, if a radiation induced error is detected on an instruction in a branch delay slot, the pipeline will be restarted with the branch preceding it; otherwise, the correct instruction sequence may not occur. This requires that the pipeline be extended by one stage for the Program Counter that keeps track of the current instruction, as well as for various control signals.

As shown in FIG. 1, a block diagram of an exemplary embodiment for processor 1000, the various design components or functional blocks used in processor 1000 fall into 3 categories:
1. Single Instance Functional Blocks: Only one instance of the component is required, although some portions of the component may use additional redundancy. In the embodiment of FIG. 1, the single instance components include the Instruction Cache (I-Cache) 1110, Data Cache (D-Cache) 1120, and external bus 1100. The D-cache is a write-through cache, whereby a separate copy of all cached data is saved in a higher level cache or in main memory. These larger memories, operating at much lower frequencies, are straightforward to protect by conventional error detection and correction methods. This reduces the fast cache soft error problem to one of error detection, since an upset memory location can be re-fetched into the cache. A number of techniques to comprehensively detect soft errors in the caches are used. These include parity protection for the storage arrays and write path into the arrays, and various redundancy checking techniques for other inputs and outputs to/from the caches. One method of using the generated error signals to maintain cache correctness is to invalidate the entire or affected portion of the cache memory. Additionally, the cache should be periodically invalidated to prevent multiple bit errors from accumulating. After such an invalidation operation, the correct values are re-fetched into the cache memory from the (assumed protected) main memory as needed. The external bus may use parity or error correcting code (ECC) bits. The former requires a bus transaction retry capability, and the latter allows correction on-the-fly.
2. Dual Redundant Functional Blocks: Each instance of a design component in this category has one other exact copy that performs the same function, at the same time, as the original. Furthermore, the dual redundant instances are spatially separated in the physical design layout such that the likelihood of both instances being corrupted by the same radiation induced error is extremely small (within the acceptable MTTF). In the embodiment of FIG. 1, the dual redundant functional blocks include processor datapath 1200, instruction decoder 1210, front-end program counter 1230, and register file 1220, among others. As one design component operates in response to signals on its external connections, its response is compared with that of its dual redundant counterpart. In the present embodiment, dual redundant mismatch checking is only performed at the boundary between speculative and architectural states in the machine, such as right before writing to architectural registers 1310, as opposed to the embodiment where mismatch checking occurs at each pipeline stage. This further simplifies and minimizes the additional hardware required for detecting and correcting such errors. When a mismatch is detected (due to a radiation induced error), the pipeline is flushed, and the operations that were in flight in the pipeline are restarted, including the instruction that was in the process of being retired. The machine may also back out of the architectural state that was just updated and restore it to the state immediately preceding the update, depending on where in the machine this update took place. For example, a corrupted cache may simply be invalidated, whereas a corrupted register file requires restoring the previous uncorrupted state. Certain architectural state is also dual redundant, and the methods used to recover from this state becoming corrupted vary depending on the specific design component.

3. Triple Redundant Functional Blocks: Each instance of a design component in this category has two other exact copies that perform the same function, at the same time, as the original. Furthermore, the triple redundant instances are spatially separated from one another in the design layout such that the likelihood of any two instances being corrupted by the same radiation induced error is extremely small. In the embodiment of FIG. 1, the triple redundant functional blocks include access datapath 1300, architectural registers 1310, Data Cache Unit (DCU) store buffer 1320, back end program counter 1330, and write buffer 1340, among others. As stimulus is applied to one design component, its response is compared with the response of its triple redundant counterparts. A voting circuit is used to select the majority response as the correct one, i.e., if one of the three responses differs from the other two, the response from the two instances in agreement is chosen as the correct one. This category is used for critical control logic and certain architectural state where recovering from radiation induced errors would be significantly more complex by using other methods. The triple redundant circuits may be implemented to allow them to self-correct, whereby the voted state is reloaded into upset copies automatically.

4. Various Control Logic: Processor 1000 also comprises in the present example various control logic 1400 representative of circuits used to control the state of processor 1000. Such circuits may be single-instance, dual-redundant, or triple-redundant depending on the portion of processor 1000 that they control. As an example, various control logic 1400 can include a clock and/or power circuitry, among other control logic.

In the text that follows further below, the exemplary embodiment is described in terms of its functional units and how they are mapped into single instance, dual redundant, or triple redundant structures. However, it should be noted here that there are multiple choices available for how this mapping is done, with various tradeoffs that need to be considered when making these choices. Generally, the goal in making these choices is to find the best solution which minimizes performance degradation, power consumption, and required hardware resources (and thus silicon area) while providing the most radiation immunity possible. For example, a cache typically consumes a large portion of the silicon area of the overall processor, so one choice for this component is to make it single instance. When considering how to map a particular design component, numerous variables must be taken into account, but a starting consideration is always how to recover when some state inside the component becomes corrupted due to an SEE. For this purpose, each component in the design generally falls into one of the following three categories: (1) control logic that steers the machine from its current state to the proper next state, (2) speculative state which is essentially work that is in progress in the pipeline that has not yet been committed to architectural state, and (3) architectural state that reflects the programmer's view of the machine, e.g., software visible registers.

For category (1), if the control logic were to become corrupted, the processor would transition to an incorrect state. In a worst case scenario, this could lead to the processor 'hanging', and the only way out of this state would be a hard reset. This would result in all work in progress being lost and potentially some unwanted state left behind, e.g., corrupted files. While it may be possible to allow the processor to transition to an incorrect state, detect that this happened, and subsequently recover, it is far easier to simply prevent this from happening in the first place by using triple redundant self-correcting structures for all such critical control logic, although this is not an absolute requirement.

For category (2), speculative state that becomes corrupted may simply be discarded along with restarting the instructions that were in progress. As a result, the key requirement here is to be able to detect that an error occurred. This could be accomplished using a single instance structure along with some type of parity checking, or a dual redundant structure where two identical copies are compared for mismatches. The cache mentioned above is a good example where a single instance could be used along with parity bits to protect the array, since the cache may simply be invalidated and the data re-fetched from a higher level of external memory (assuming a write through cache on the data side). On the other hand, the processor datapath pipeline might be a better candidate for a dual redundant structure since a parity scheme is more difficult to implement in this instance.

For category (3) it is imperative that when the architectural state becomes corrupted, one must be able to restore it to a known good state and restart the machine at the appropriate point in the execution sequence. A triple redundant structure is one option here, but this is the most costly in terms of hardware resources required and additional power consumption, so this choice may be best for small structures, e.g., a limited set of architecturally visible control registers. An additional backup register may be required for each of these as well for the case where the register is corrupted as it is being written. For a large register file, a triple redundant structure is an option. Another option would be to have a dual redundant structure to allow a mismatch to be detected between the two instances, along with a parity checking scheme to be able to identify the instance that was corrupted. Using this latter approach, the good instance could then be used to repair the corrupted instance.

Obviously, there are multiple design choices available for the above three categories, resulting in numerous possibilities for combining the three approaches to obtain the most optimum design using the metrics discussed above. Although an exemplary embodiment is presented here, it is by no means the only approach for combining single instance, dual redundant, and triple redundant structures to achieve a radiation hardened by design processor.

For the exemplary embodiment, the majority of the circuitry falls into categories (1) and (2) above. The type of redundancy used for specific functional blocks in the present example may be further discerned with reference to the legend in FIG. 1. The major functional blocks of the exemplary embodiment of processor 1000 are as follows:

Instruction cache (I-cache) 1110: used to cache instructions.

Instruction Fetch Unit (IFU) Fill Buffer 1350: used to buffer instructions obtained from external memory prior to writing them to the I-cache.

Instruction Translation Lookaside Buffer (ITLB) 1240: used to cache virtual-to-physical address translations for instruction references. This is a relatively small TLB that allows fast lookups.

Data cache (D-cache) 1120: write-through cache used to cache data. All stores to the D-cache are also propagated to external memory.

Data Cache Unit (DCU) Fill Buffer 1360: used to buffer data obtained from external memory prior to writing it to the D-cache.

DCU Store Buffer 1320: store operations are first written to the Store Buffer before being committed to the D-cache and external memory (although simultaneous Store Buffer and D-cache writes are possible).

Write Buffer 1340: used to accumulate the data from multiple writes before that data is sent to external memory.

Data Translation Lookaside Buffer (DTLB) 1250: used to cache virtual-to-physical address translations for data references. This is a relatively small TLB that allows fast lookups.

Primary TLB 1260: This is a larger and slower TLB used to cache virtual-to-physical address translations for both instruction and data references. The ITLB and DTLB will access the Primary TLB when a translation requested from them is not available. When a translation requested from the Primary TLB is not available, an exception occurs and software is responsible for writing the requested translation into the Primary TLB. This translation is found in page tables residing in memory.

Program Counter (PC): points to the current instruction to be executed. Due to the pipelined nature of the processor, the PC has a different value in each pipeline stage, reflecting the different instructions present in each pipeline stage. As described above, the program counter may be double-redundant or triple redundant depending on the pipeline stage where it is located. For example, front-end program counter 1230 is dual-redundant, while back-end program counter 1330 is triple-redundant in the preset example.

Instruction Decoder 1210: responsible for decoding the instructions.

Integer Execution Unit (IEU) 1270: responsible for executing integer based instructions, except for multiply and divide operations. This is in contrast to floating point operations. Although the present embodiment does not have a hardware floating point unit, the techniques described here apply equally well to such a unit.

Multiply/Divide Unit (MDU) 1280: responsible for executing integer multiply and divide instructions.

Multiply and Accumulate (MAC) Registers 1370: responsible for holding the result of certain MDU instructions. Other MDU instruction results may be written directly to the Register File (see below).

Register File 1220: contains all of the general purpose integer registers.

Architectural Registers 1310: consists of various architecturally visible system control registers that control the state of the processor in the form of registers that are not part of the Register File.

Various control logic 1400: consists of logic used to control the state of the processor.

The following provides a brief description of the machine to illustrate the radiation hardening techniques used for the constituent components. The description does not detail the circuits for every possible instruction, but provides enough information to understand the general approaches used. In some cases multiple approaches may be appropriate for a particular processor block.

When an instruction is fetched, a virtual address is presented to the ITLB to obtain the physical address to which it is mapped. If the ITLB does not contain the translation, the Primary TLB is looked up. And finally, if the primary TLB does not contain the translation, it is obtained from page tables in external memory. If a dual redundant mismatch is detected in either the ITLB or Primary TLB during this process, the pipeline is flushed, the ITLB (and Primary TLB, if necessary) are invalidated, and the instruction that requested the translation is restarted. Once a physical address is obtained, the I-cache is looked up, assuming a reference to cacheable memory space. If an error is detected during the I-cache lookup, either via parity checking or dual redundant checking of various cache interface signals, the pipeline is flushed, the I-cache is invalidated, and the pipeline is restarted at the instruction that was fetched when the error was detected (unless the instruction was in a branch delay slot, in which case the preceding branch is restarted). If the I-cache lookup results in a miss, the instruction is fetched from external memory. In addition to the instruction being fetched, additional neighboring instructions will be fetched in order to obtain a full "cache line" that will be written to the I-cache. These are assembled into the IFU Fill Buffer prior to being written to the I-cache. In this embodiment, the IFU Fill Buffer is triple redundant, along with the access datapath leading thereto from the external bus, so any corruption that occurs in this part of the circuitry will be automatically corrected. On the other hand, the processing datapath between the IFU Fill Buffer and the I-cache, and between the IFU Fill Buffer and the instruction pipeline are dual redundant. The dual redundant write datapath into the I-cache is such that one of two redundant instances is used to actually write the I-cache while the other instance is used to check for mismatches. If a dual redundant mismatch is detected when the cache line is written to the I-cache, the latter is invalidated, the pipeline is flushed, and the instructions in progress are restarted.

Once a valid instruction is obtained from the IFU Fill Buffer, it is decoded and control signals are sent to the appropriate execution unit, i.e., the IEU, MDU, or D-cache, after any required source operands are read from the Register File. The result of the computation is then written to architectural state. This includes the Register File, MAC Registers, other registers containing architectural state, the DCU Store Buffer, the caches, and the PC. Beyond the DCU Store Buffer, architectural state includes the Write Buffer and external memory, but these are written to after the DCU Store Buffer. In the present embodiment, error checking is performed at the boundary between the speculative and architectural states, i.e., in the cycle when the architectural state is written. However, since the caches are single instance components, without a counterpart that may be used to check against further down the pipeline, checking is continuously performed for both the I-cache and D-cache, regardless of any intended state updates. In the caches, a soft error in certain circuitry could cause an otherwise undetectable corruption at any time. Whenever a soft error is detected anywhere in the machine, any valid instruction currently present in the pipeline stage associated with the error and all valid instructions that follow it are flushed and restarted. The flush will not take place, however, until the oldest instruction in question reaches the end of the pipeline. This keeps the pipeline flush and restart mechanism the same for all cases. The method by which error detection and correction is handled for architectural state updates depends on the destination of the write, as described below.

D-CACHE: Many of the signals that interface with the D-cache are dual redundant, with one instance feeding the cache and then subsequently being sent back out to be checked against its dual redundant counterpart. If an error is detected at this time, the pipeline is flushed, the cache is invalidated, and the instruction that was attempting to write to the D-cache is subsequently restarted. For the write datapath into the D-cache, dual redundancy with appropriate spatial separation is used up to a point outside the cache with error checking and correction handled as above. Beyond this point all the way to the RAM cells that are written inside the array, appropriate spacing is maintained between bits belonging to the same parity group to ensure that a radiation induced error will affect at most one bit per parity group. This latter type of error will not be detected until a subsequent read of the cells in question, when parity checking is performed. This same approach is used as when writing to the I-cache.

For its part, the DCU Fill Buffer is triple redundant along with the access datapath leading up to it from the external bus. The reason for this choice, as opposed to, say, making these structures dual redundant, is that restarting a load instruction to a memory-mapped I/O device could have negative side effects at the system level and lead to incorrect behavior. For example, if a load instruction is issued to retrieve data from a serial port, the latter may reload its data buffer with the next data item once the load has retrieved the data requested from the serial port's data buffer. If the load were to be re-issued due to data corruption being detected inside the processor, it would no longer get the correct original data that it retrieved, but instead would get the next data item. As a result, the DCU Fill Buffer and the access datapath leading up to it from the external bus are triple redundant to ensure that data will not be lost in this event. If a restart of the load is required, it will now obtain the data from the Fill Buffer. Note that this case only applies to certain memory-mapped I/O devices. However, to minimize design complexity, all such cases are handled the same way, including instruction fetches.

REGISTER FILE (RF): The RF is dual redundant and uses parity to protect the storage cells. Not only are dual redundant cells spatially separated, but bits within the same parity group are also spatially separated to ensure that a soft error corrupts at most one bit per parity group. Corrupted data may either be read from the RF or written to the RF. When data is read from the RF during normal operation in the present embodiment, no specific error checking is performed. An error is simply allowed to propagate down the dual redundant pipeline where the result of some computation will ultimately be written to architectural state. It is at this point that the error checking occurs, unless a single instance cache is accessed (in which case checking is immediate). When the destination of that result is the RF, the target register is read out in the cycle prior to the RF update and saved in storage outside the RF. If a dual redundant mismatch is detected in the RF write data, the pipeline is flushed, the saved register is restored, and an RF "repair cycle" is initiated. In fact, this RF repair cycle is always initiated on a pipeline flush due to a soft error, since the source of a soft error is not always known when it is detected.

A RF repair cycle consists of stalling the pipeline restart while all RF registers are read out. As each register is read out, it is checked for parity errors. When a parity error is detected in a register, the non-corrupted dual redundant counterpart is written back to restore the correct value. Since each register is split into parity groups, it is possible that a soft error spans both registers. However, no more than one bit per parity group will be affected (within the required MTTF). This requires that the value written back to each register be assembled from the parity groups of each dual redundant register, using only groups that have not been corrupted. Once the RF repair cycle has finished, the pipeline is restarted with the instruction that was being retired when the error was detected (unless the instruction was in a branch delay slot, in which case the preceding branch is restarted). Additionally, a specific read port in the RF is opportunistically used to scrub the RF when it is not being used by an instruction. This scrubbing involves reading one register at a time and continuously rotating through all registers in the RF. As each register is read, it is checked for parity errors. If an error is detected, the process described above is again followed. This minimizes the probability of multiple bit errors accumulating over time in the same parity group of a register that may not be accessed in that interval. The register file also incorporates protection against inadvertent writes, which can produce undetectable errors, i.e., silent data corruption.

ARCHITECTURAL REGISTERS AND MAC REGISTERS: These are all triple redundant, with a backup register behind each primary register. Each backup register is spatially separated from its corresponding primary register. When one of these primary registers is written and no error is detected, this value is immediately written to the backup register as well. On a subsequent write, if an error is detected, the pipeline is flushed (including the instruction that wrote to the register), the backup register is restored into the primary register, and the pipeline is then restarted.

Figure 2:
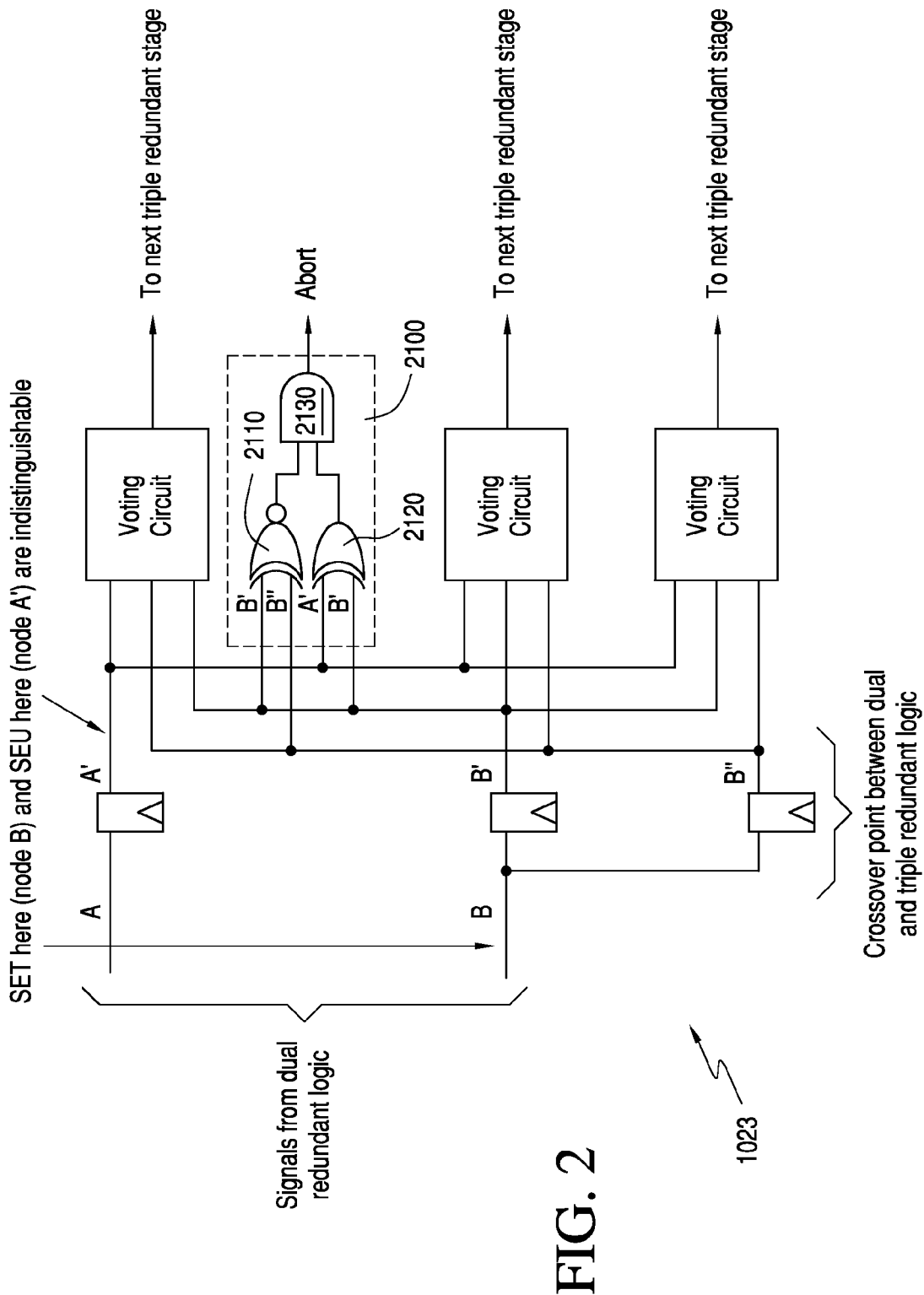
FIG. 2 shows an exemplary dual to triple redundant logic crossover.

This case highlights an interesting situation that occurs in this processor design: there are places where a crossover occurs between one type of logic redundancy and another, e.g., between dual redundant and triple redundant circuitry. FIG. 2 shows an example of a dual-to-triple redundant crossover 1023 from FIG. 1. In the present example, crossover 1023 is from the dual redundant pipeline 1200 to the triple redundant architectural state registers 1310 that hold architectural state. This type of crossover is actually not trivial, as described below.

When crossing over from the dual redundant to the triple redundant domain, it's possible for a soft error to corrupt one of the dual redundant signals. Since only two signals are available to feed into the three triple redundant paths, one of the two signals must be used as input to two of those paths. If that's the one that gets corrupted by a soft error, the triple redundant logic will be immediately corrupted with an uncorrectable error.

For example, in FIG. 2, if an SET error occurs on node B, both nodes B' and B" will be corrupted. This, in turn, will result in an incorrect output from the triple redundant voting circuits. Unfortunately, it may not be possible to detect that nodes A and B mismatch before the values are clocked into the triple redundant logic. Additionally, the error signal itself could not be reliably clocked along with nodes A and B, since the SET may occur late in the clock cycle, resulting in a setup violation at the error signal's flip-flop input. Some type of non-clocked SR latch could be used, but this type of asynchronous design can be difficult. Note that an SEU that corrupts node A' (which can be corrected by the triple redundant logic) is not distinguishable from an SET that corrupts node B (which is not correctable by the triple redundant logic, as it results in 2 of the 3 triple redundant nodes (B' and B") getting corrupted). Consequently, this situation needs to be detected to abort the operation in progress when it occurs.

The situation can be detected by adding checking circuitry, such as mismatch checker 2100, for the case where ((B'==B") AND (B'≠A')). In effect, such checking detects a mismatch between nodes A and B but based on a comparison of nodes A', B', and B" to avoid the clocking or timing issues described above. In the present example, the test for (B'==B") is implemented via XNOR circuit 2110, while the test for (B'≠A') is implemented via XOR circuit 2120. The outputs of XNOR circuit 2110 and XOR circuit 2120 are then "anded" together at AND circuit 2130 to generate the abort signal.

Because it may not be possible to determine whether an error comprised an SET on node B, or an SEU on node A', we therefore assume the worst case, i.e., an SET on node B. In FIG. 2, the 'abort' signal is asserted by mismatch checker 2100 when an error condition is detected, initiating the error correction scheme described above for flushing and restarting the pipeline of processor 1000. Note that the 'abort' signal itself is susceptible to an SET corruption. When this happens, it will erroneously signal a false error resulting in a pipeline restart. The mechanism will repair a correct state with another correct state, losing a few clock cycles, but this will be an infrequent event, so no harm is done as a result.

Figure 8:
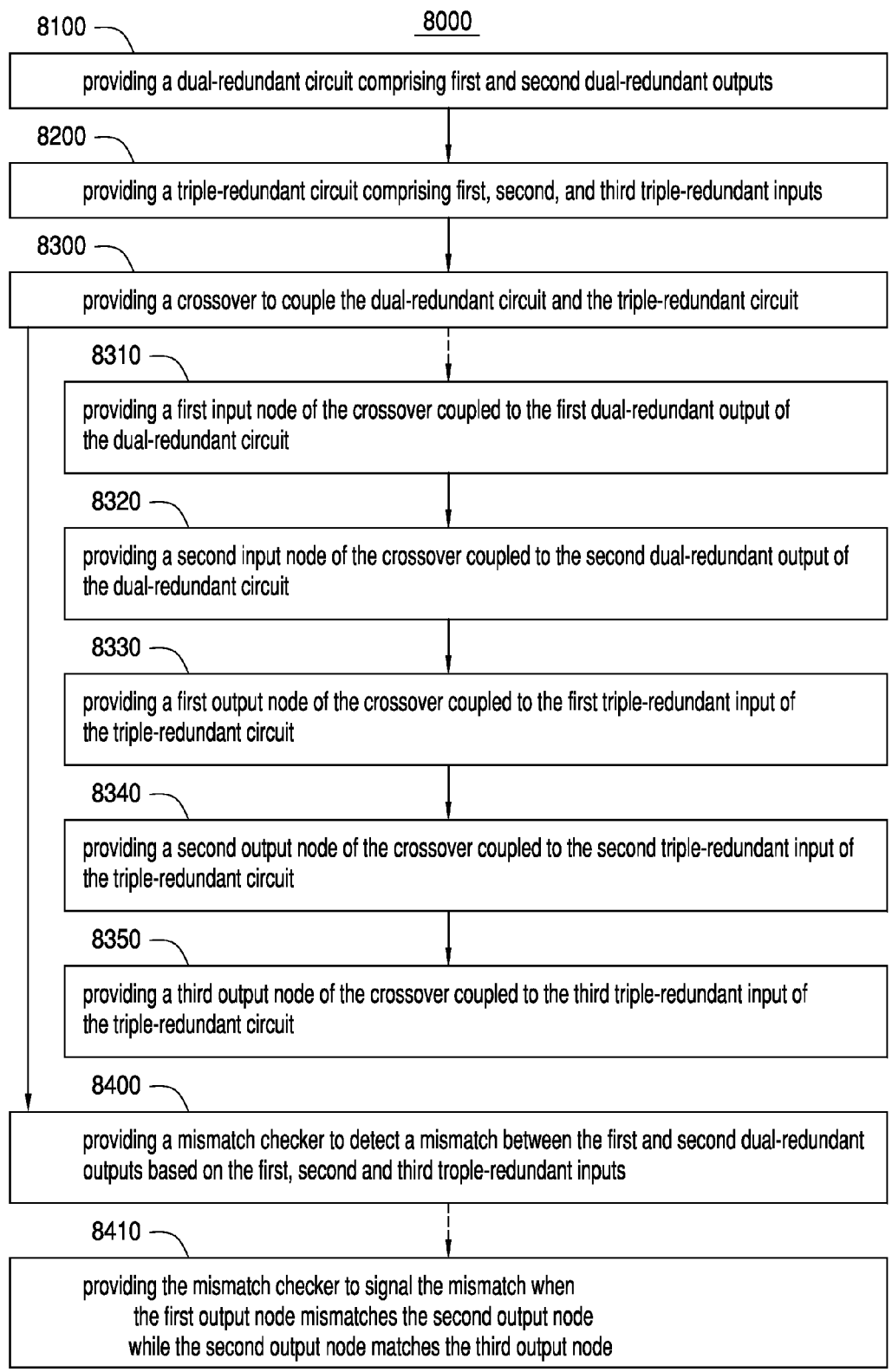
FIG. 8 illustrates a flowchart of a method for providing a processor comprising a dual-to-triple redundant crossover circuit.

Skipping ahead in the figures, FIG. 8 illustrates a flowchart of method 8000 for providing a processor comprising a crossover similar to that described herein for dual-to-triple redundant crossover 1023 in FIG. 2 and in accordance with the description herein for similar crossovers. In some examples, some of the blocks of method 8000 can be subdivided into one or more different or further sub-blocks. In the same or other examples, one or more of the different blocks of method 8000 can be combined into a single block or performed simultaneously, and/or the sequence of such blocks can be changed. There can also be examples where method 8000 can comprise further or different blocks. Other variations can be implemented for method 8000 without departing from the scope of the present disclosure.

DCU STORE BUFFER: Returning to FIG. 1, DCU store buffer 1320 is shown coupled to data cache 1120 via processor datapath 1200, and to external bus 1100 via access datapath 1300. When a store instruction is executed, the data is written to the triple redundant DCU Store Buffer. This write occurs simultaneous with the write to the D-cache when a following instruction, e.g., a load, does not conflict with the D-cache write. Otherwise, the data is held in the Store Buffer until the D-cache can be updated. The Store Buffer therefore acts as an extension of the D-cache. The store is also forwarded from the Store Buffer to the Write Buffer. The latter assembles multiple stores before sending them out to the external bus.

A write to the Store Buffer corresponds to a crossover from the dual redundant processor datapath pipeline to a triple redundant structure, and error detection occurs as described above. In this event, the pipeline is flushed and the store is ultimately restarted after the RF repair cycle and any other logical state cleanup activities required. The latter includes flushing the D-cache if it was written at the same time as the Store Buffer. Beyond the Store Buffer, the Write Buffer is also triple redundant, so voting circuits will correct any errors that occur in this path.

Figure 3:
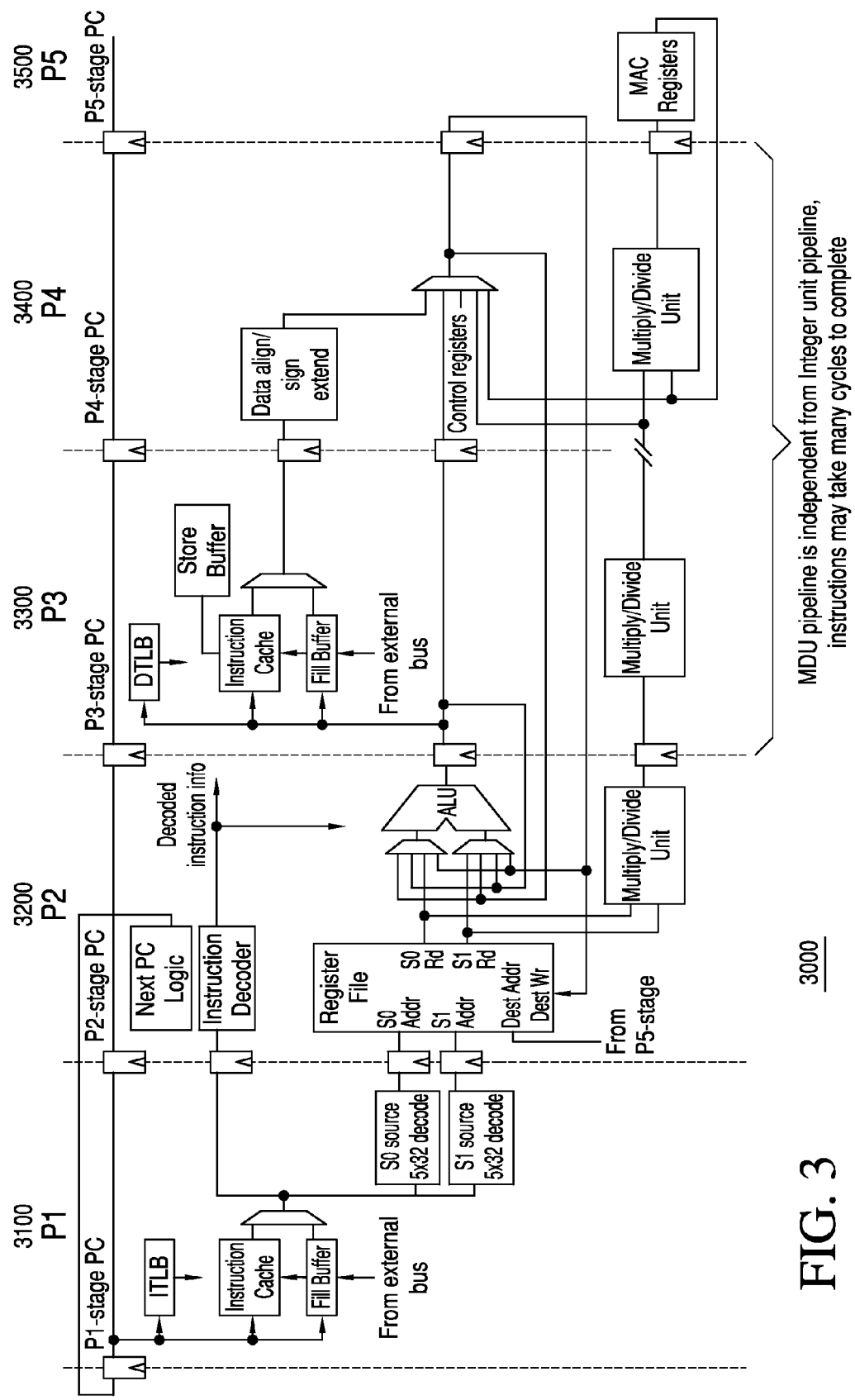
FIG. 3 shows a high level simplified pipeline diagram of an embodiment of a processor without radiation hardening features.

PROGRAM COUNTER (PC): Whenever the pipeline is flushed due to a soft error, it is crucial that a correct restart address be provided. This is achieved by making the PC in the back-end of the pipeline triple redundant. In order to gain further insight into how this works, a high level, simplified pipeline diagram of one embodiment of the processor without radiation hardening features is shown in FIG. 3. FIG. 3 shows a 5-stage pipeline 3000, with pipeline stages 3100 (P1), 3200 (P2), 3300 (P3), 3400 (P4), and 3500 (P5).

The work done in each pipeline stage for the Integer Execution Unit can be as follows:
P1: Fetch instruction
P2: Read Register File source operands and decode/execute instruction
P3: Memory access for load and store instructions
P4: Data alignment and sign extension for load instructions
P5: Write back result As mentioned earlier, for the radiation hardened version of the exemplary embodiment, error checking is performed at the boundary between speculative and architectural states. This boundary is the P5 stage in most cases. For the case where the checking boundary is the write back stage (P5), if a radiation induced error is detected on an instruction in a branch delay slot, the pipeline will be restarted with the branch preceding it; otherwise, the correct instruction sequence might not occur. This requires that the pipeline be extended by one stage for the Program Counter that keeps track of the current instruction, as well as for various control signals.

Figure 4:
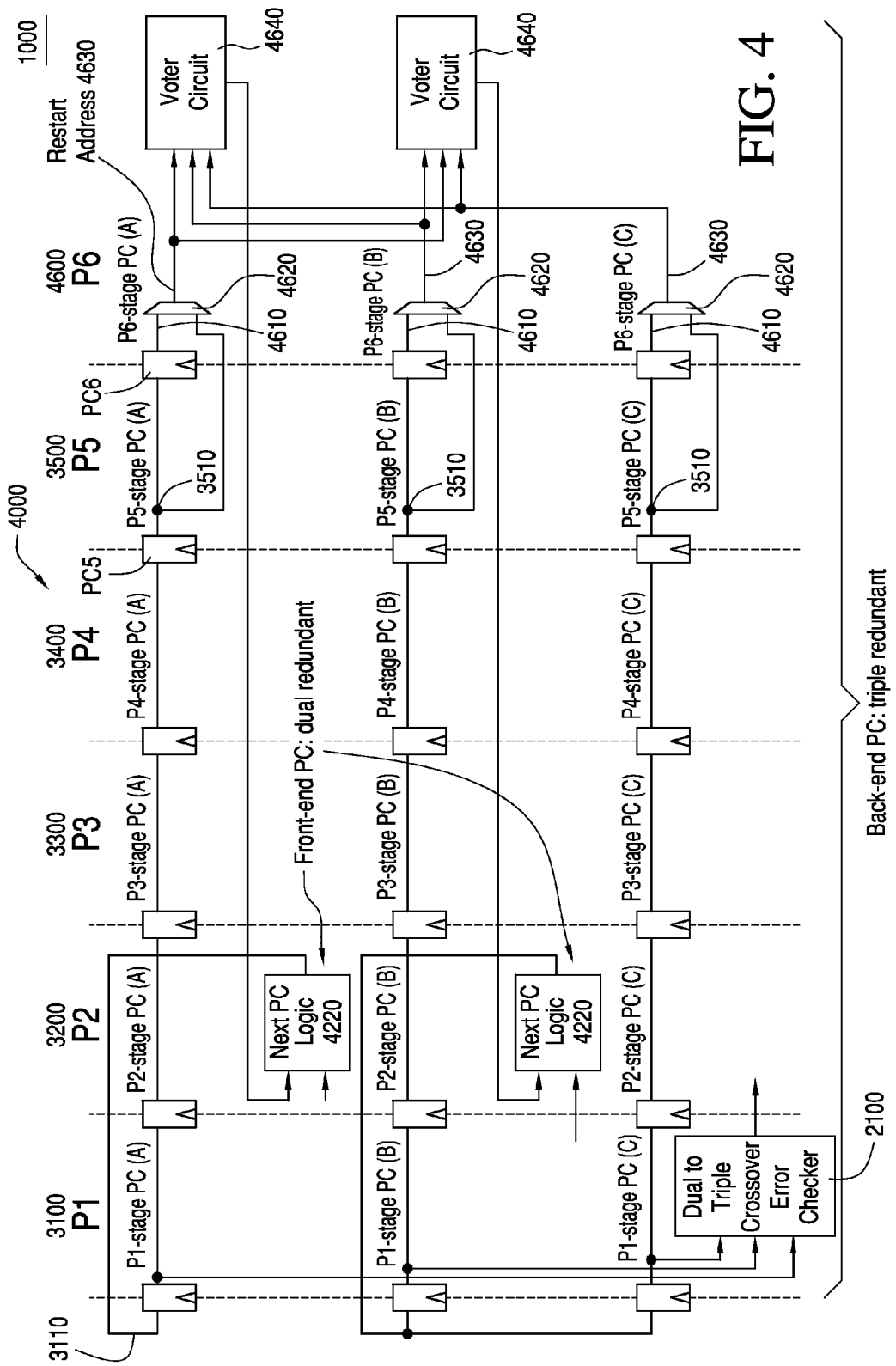
FIG. 4 shows a pipeline diagram for an exemplary embodiment of a program counter with radiation hardening features.

A new pipeline diagram showing only the PC for the exemplary embodiment of the radiation hardened processor is shown in FIG. 4. This pipeline diagram does not show every detail associated with the PC. The intent is to provide sufficient information to understand the radiation hardening mechanisms. There are special cases not shown, but the same techniques described in this disclosure are applied in similar fashion to harden all of the circuits.

FIG. 4 shows a diagram of execution pipeline 4000 of processor 1000. Execution pipeline 4000 is similar to pipeline 3000 (FIG. 3), but an additional pipeline stage 4600 (P6) has been added thereto. For simplicity, only elements related to the program counter are shown in FIG. 4 for execution pipeline 4000. In general terms, when a soft error is detected on the instruction retiring in pipeline stage 3500 (P5) and this instruction is in a branch delay slot, the restart address after the pipeline is flushed must be that of the branch preceding it, i.e., the PC from pipeline stage 4600 (P6). Otherwise, the restart address is the PC from pipeline stage 3500 (P5).

In the present example of execution pipeline 4000, pipeline stage 3500 comprises a final execution stage, where instruction execution normally terminates for instructions in pipeline 4000. Pipeline 4000, however, also comprises pipeline stage 4600 subsequent to pipeline stage 3500. Pipeline stage 3500 comprises final program counter 3510 for a final instruction address configured to address a final instruction that is in pipeline stage 3500 during a current clock cycle. Similarly, pipeline stage 4600 comprises backup program counter 4610 for a backup instruction address configured to address a retired instruction that was in pipeline stage 3500 during a previous clock cycle immediately precedent to the current cycle. Execution pipeline 4600 also comprises restart address selector 4620 at pipeline stage 4600, where restart address selector 4620 is configured to output a restart address that can be used to restart execution pipeline 4000 in case of error. In cases where the final instruction comprises an instruction that is not in a branch-delay-slot, restart address selector 4620 will select the final instruction address from program counter 3510 for output as restart address 4630. In cases where the final instruction comprises an instruction that is in a branch-delay-slot, restart address selector 4620 will select the backup instruction address from backup program counter 4610 for output as restart address 4630. It should be noted that, because the back-end program counter for processor 1000 is triple-redundant, some of the elements described herein for execution pipeline 4000 may be illustrated for each of such triple-redundant instances.

In the present example, processor 1000 is also configured to detect when the final instruction at pipeline stage 3500 is corrupt or otherwise comprises a soft error, such as a soft error caused by an SET. In such cases, processor 1000 can restart execution pipeline 4000 based on restart address 4630, where restart address 4630 is provided to front-end program counter 3110 for pipeline stage 3100. In the present example, restart address 4630 reaches front-end program counter 3110 via voter circuit 4640 and next-program-counter logic circuit 4220, where next-program-counter logic circuit 4220 forwards restart address 4630 when the corruption or soft error has been detected for the final instruction at pipeline stage 3500.

FIG. 4 also shows the dual redundant front-end PC and the triple redundant back-end PC. There are two general cases that must be considered:
1. An error is detected that does not cause the PC to become corrupted.
2. An error is detected that does cause the PC to become corrupted.

In case (1), the pipeline is flushed and the restart address comes from the PC in P5 or P6, depending on whether the instruction retiring in P5 is in a branch delay slot. In case (2), there are two places of concern: (a) at the dual-to-triple redundant crossover point between the front-end PC and the back-end PC, and (b) at the output of the triple redundant PC voting circuits that are used to specify the restart address to the front-end PC when the pipeline has been flushed due to a soft error. For case (a), when a soft error is detected by the dual-to-triple redundant crossover error checker, the triple redundant PC in P1 cannot be used. As a result, the restart address supplied when the pipeline is flushed due to this soft error must come from the PC of a previous instruction. In this case, that instruction is the last one to have retired in the P5 stage, unless it happens to be in a branch delay slot, in which case the PC comes from the preceding branch instruction in the P6 stage.

A special case occurs here when an exception is taken. This causes the pipeline to be flushed as well, and an exception vector is supplied that points to an exception handler. If the crossover error is detected when the vector reaches P1, there will not be a valid instruction in the pipeline ahead of it. For this case, a mechanism is provided to again flush the pipeline and supply the same exception vector again (this apparatus is not shown in FIG. 4). For case (b), this is only a problem if an error affects both the voting circuit and some other circuit that will result in the architectural state being corrupted. For this reason, the PC voting circuits are spatially separated not only from each other, but also from other critical circuits to avoid this situation, e.g., latches providing data to the RF.

Note in the above pipeline diagram that voters are only required at the final stage of the pipeline. The reason for this is that the circuit layout provides physical separation such that a soft error that corrupts one of the PC instances (i.e., A, B, or C) will not affect the other two in the same pipeline stage. In other words, if a soft error corrupts a PC for the A instance in P3, the B and C instances of the PC in P3 will not be corrupted. As a result, a soft error will simply propagate down the pipeline and will ultimately be voted away by the majority once it reaches the end of the pipeline. Since the assumption is that soft errors should not occur consecutively for many clock cycles, i.e., they are infrequent events, there should not be a situation where two of the PCs in the same pipeline stage become corrupted by two different SEEs before they reach the end of the pipeline. However, there are cases where the pipeline will be stalled for multiple cycles, e.g., a cache miss. In this situation the number of cycles should still be small enough to not be concerned about another error occurring before the first one reaches the end of the pipeline. If this is a concern, another embodiment can be used to place voters for the PC in every pipeline stage.

Figure 7:
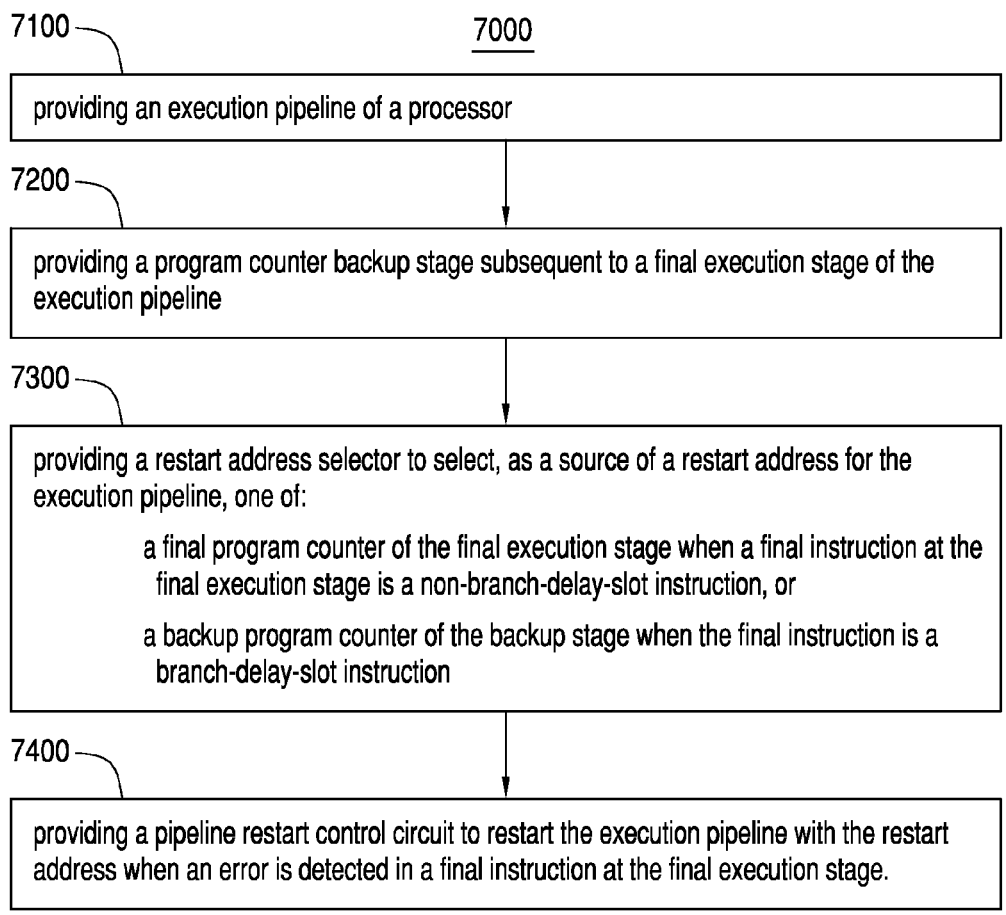
FIG. 7 illustrates a flowchart of a method for providing a processor comprising an execution pipeline with radiation hardened by design elements.

Skipping ahead in the figures, FIG. 7 illustrates a flowchart of method 7000 for providing a processor comprising an execution pipeline similar to that described herein for execution pipeline 4000 in FIG. 4 and in accordance with the description above for program counters. In some examples, the pipeline restart control circuit of block 7400 in method 7000 can comprise or be otherwise coupled to logic similar to that for next-program-counter logic circuit 4220 (FIG. 4). In some examples, some of the blocks of method 7000 can be subdivided into one or more different or further sub-blocks. In the same or other examples, one or more of the different blocks of method 7000 can be combined into a single block or performed simultaneously, and/or the sequence of such blocks can be changed. There can also be examples where method 7000 can comprise further or different blocks. Other variations can be implemented for method 7000 without departing from the scope of the present disclosure.

EXTERNAL BUS: Returning to FIG. 1, external bus 1100 is shown coupled to access datapath 1300. There are two general cases here: (1) processor initiated reads from the external system, and (2) processor initiated writes to the external system. The external bus is a single instance component and may be protected using parity or an Error Correcting Code (ECC) for an on-chip bus (as would be used in system-on-chip devices), or by making the bus drivers strong enough, i.e., with sufficient drive strength and capacitance to withstand SEEs for an off-chip bus. With a parity scheme, bus transactions that fail may simply be re-tried. This is achieved using an appropriate handshake protocol between the processor and the external system. With ECC, errors may be corrected on-the-fly as long as certain design constraints are met. For processor initiated reads from the external system that have no errors on the external bus, data is brought into the processor via a triple redundant data path as described earlier. For processor initiated writes to the external system, the transaction information (i.e., address, data, and type of write) is stored in the triple redundant Write Buffer. This information makes its way to the external bus inside the processor via a triple redundant data path as well. As a result, this critical architectural state is retained until it is successfully stored external to the processor.

A key component in the processor is the clock network, represented in FIG. 1 under various control logic 1400. This clock network has single instance clocks for the single instance components, dual redundant clocks for the dual redundant components, and triple redundant clocks for triple redundant components. The PLL is designed to be radiation hardened as clock pulses that occur at the wrong time will cause incorrect data to be sampled throughout the machine, upsetting the architectural state in all redundant copies. Within the processor, the separate clocks provided to redundant copies ensures that if one is upset, the other copies will not be, allowing proper detection of that event. This also allows clock gating of individual clocks, which is key to power savings. The global clock network must be designed to have sufficient drive and capacitance such that it is immune to SETs on those nodes.

It should be noted that another embodiment is possible, which was briefly touched upon earlier. In this embodiment, dual redundant mismatch checking is performed between state elements in every pipeline stage. When an error is detected prior to the writeback stage, the pipeline may simply be flushed without backing out of a state update. And at the boundary between speculative and architectural states, one option is to use parity or some form of error correcting code (ECC), which is generated and written along with the data to architectural state. The processor datapath circuits are spatially separated in this case such that no more than one bit per parity group may be corrupted, or in the case of ECC, no more than the maximum allowable number of bits per ECC group, given the chosen ECC scheme. If radiation induced data corruption occurs at this boundary, the error will be caught on a subsequent read of this data when its corresponding parity or ECC is checked. The dual redundant uncorrupted copy may then be used to restore the correct value, or alternatively, the error may be corrected using the ECC bits.

The apparatus for crossing over from a dual redundant to a triple redundant domain was described above. However, other cases occur as well, as seen in the example of FIG. 1 for processor 1000. The paragraphs below cover the other crossover cases as well as whether they occur, and if so, how they are handled.

SINGLE INSTANCE TO DUAL REDUNDANT CROSSOVER (1012): This case occurs when transitioning from the output of the two caches to the core pipeline. Each cache array and its associated bitlines and sense amps are implemented as single instances. In addition to the spacing requirement between RAM cells in the array itself, a minimum spacing requirement is also enforced between the sense and write circuits so that a radiation induced error that affects one of these items should cause at most one corrupted bit per unit of parity-protected data in the data read out of the array. As a result, parity can catch such errors. Beyond that point, the remaining output interface is entirely dual redundant. Once in the dual redundant domain, errors are caught by comparing dual redundant state element outputs as described above.

SINGLE INSTANCE TO TRIPLE REDUNDANT CROSSOVER (1013): This case will not occur when transitioning from the output of the two caches. Any control signals that are generated as a result of a cache array output will have the dual redundant logic that follows the cache output as their source. As an example, the 'Hit' signal that is provided to indicate the result of a cache lookup will be dual redundant. The comparators that are used to compare the tag array outputs with the tag presented during the lookup are duplicated, and this results in duplicate Hit signals. The Hit signal, in turn, is used by triple redundant control logic. So this case is actually a dual to triple redundant crossover case. The only place in the chip where a single instance to triple redundant crossover occurs is between the external bus and the processor's inputs. For each of the processor's inputs, the wire coming from the input pin will be routed to 3 triple redundant input paths that have a minimum spacing to prevent more than one from being corrupted by a soft error, thus allowing the triple redundant voter circuits to correct any errors.

DUAL REDUNDANT TO SINGLE INSTANCE CROSSOVER (1021): This case occurs at the input to the caches. At the crossover point, a value must be selected from one of the two redundant sources. This is the point where it's possible for a soft error to corrupt the selected dual redundant output, thus corrupting the single instance path that is generated from it.

Data returned from the external bus that is destined for a cache is dual redundant at the boundary of the cache array, which ensures that an error can be detected up to this point. Internally generated writes to the caches also flow through a dual redundant path. However, at the array itself, a value must be chosen to write from one of the two redundant sources, where it's possible that a soft error will corrupt the output of this source during the write operation. From the point where the data is actually sent to the cache from one of the dual redundant sources, minimum spacing between bits in the same parity group is maintained all the way up to the cache RAM cells to ensure that no more than one bit per parity group may be corrupted, thus allowing such errors to be detected by parity checking on a subsequent read of the cache.

DUAL REDUNDANT TO TRIPLE REDUNDANT CROSSOVER (1023): This case was discussed earlier with respect to FIG. 2, and occurs when going from the dual redundant core pipeline to triple redundant control logic, as well as triple redundant architectural state. The transition to architectural state was described. For control logic, it is handled on a case by case basis, but generally involves some type of handshake protocol.

TRIPLE REDUNDANT TO SINGLE INSTANCE CROSSOVER (1031): There are two places in the processor where this type of crossover can occur: (1) at the input to the caches (control logic only), and (2) for outputs going to the external bus. At the crossover point, a value from one of the three redundant sources must be selected. This is the point where a soft error could corrupt the selected triple redundant output, thus corrupting the single instance path that is generated from it. Control inputs to the caches are sent in and then sent back out to be checked against a dual redundant counterpart. In this instance, one of the triple redundant control signals is sent to the cache, and another one is used as the dual redundant counterpart with which the first signal will be compared. The third redundant signal is unused once it reaches the cache. Outputs going to the external bus are handled according to the type of bus used. In the case of an on-chip bus, a parity scheme could be used with appropriate spacing between outputs belonging to the same parity group. In the case of an off-chip bus, the triple redundant voter circuit could be designed with sufficient drive strength and capacitance to withstand SEEs.

TRIPLE REDUNDANT TO DUAL REDUNDANT CROSSOVER (1032): This case occurs in all places where triple redundant control logic or architectural state (e.g., processor state control registers, Write Buffer) is passed into a dual redundant domain (e.g., core pipeline). In this situation, two of the three triple redundant outputs are selected to drive the dual redundant logic. Beyond that point, errors are detected by a dual redundant mismatch on duplicated state element outputs, and are corrected according to the location where they occur.

As seen in FIG. 1, there may be interfaces between elements of processor 1000 where more than one crossover is needed. For example, because processor datapath 1200 comprises a two-way path between architectural registers 1310 and instruction cache 1110, the interface to/from architectural registers 1310 can comprise a triple redundant to dual redundant crossover 1032 from architectural registers 1310 to processor datapath 1200, and a dual-redundant to triple-redundant crossover 1023 from processor datapath 1200 to architectural registers 1310. Other similar scenarios with more than one crossover are appreciable from the schematic for FIG. 1.

Figure 5:
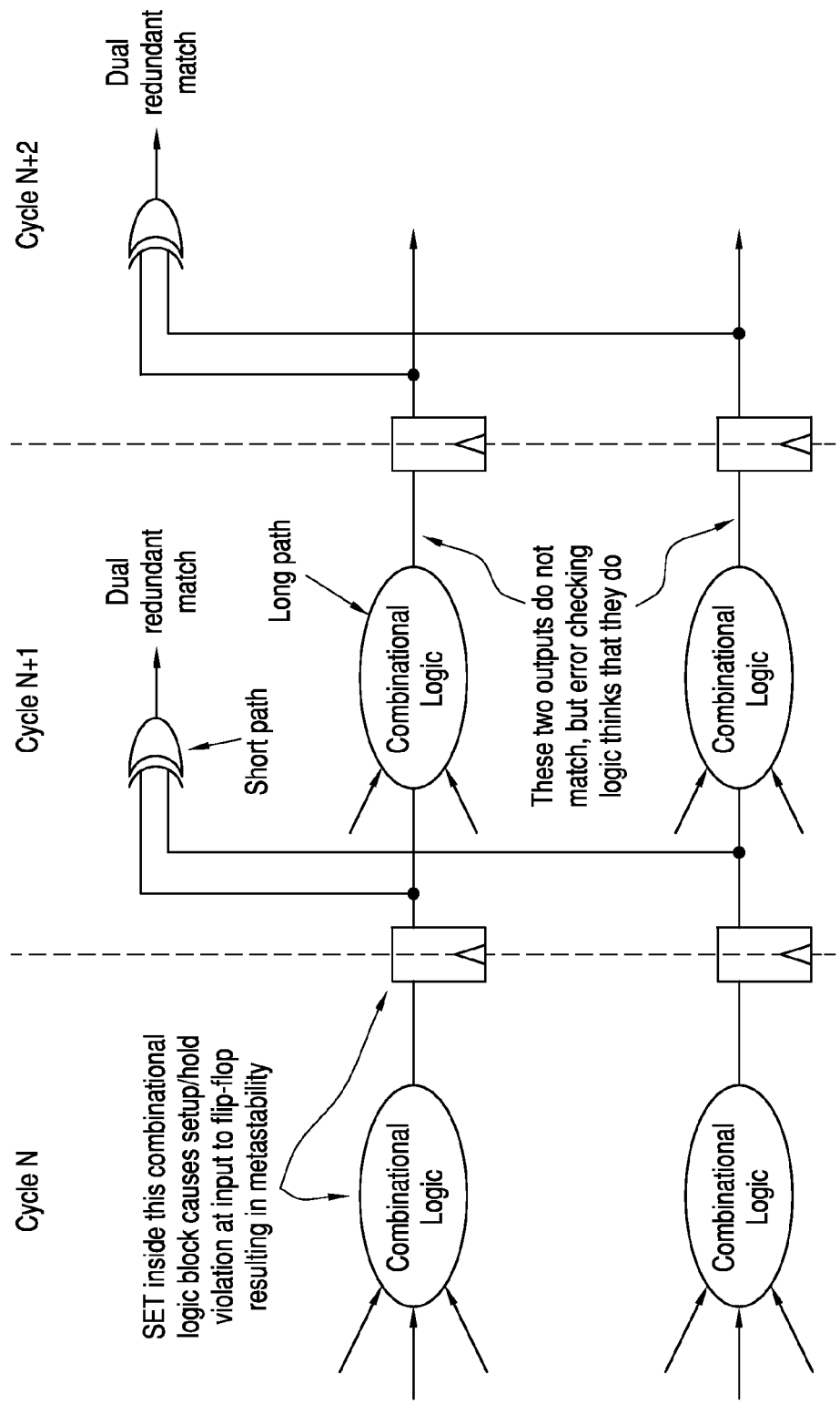
FIG. 5 illustrates the problem of different path delays due to single event effects and metastability.

One final area that is important to cover is the issue of metastability that may be induced or caused by an SET at the clock edge in the transferring circuitry. A microprocessor is basically a large synchronous finite state machine. It is operates synchronously, with a periodic clock signal dictating when logic from one pipeline stage is sampled, and synchronizing the signals to the next pipeline stage logic. On the other hand, SETs and SEUs are asynchronous events within the processor. They do not occur within well behaved synchronous windows. As a result, clocked state elements are now susceptible to metastability, which is normally avoided in synchronous designs by timing analysis to ensure that setup and hold times are not violated at the intended clock rates. This is illustrated in FIG. 5. An SET causes a transient pulse inside one of the dual redundant combinational logic blocks in cycle N resulting in a setup/hold violation at the flip-flop driven by the combinational logic. This may result in a metastable state at the flip-flop output in cycle N+1. In this situation, it is possible that the error checking logic will not see a mismatch in cycle N+1 between the dual redundant flip-flop outputs whereas the combinational logic driven by the metastable flip-flop will see the incorrect value. This can occur due to different path delays or circuit sensitivities.

Figure 6:
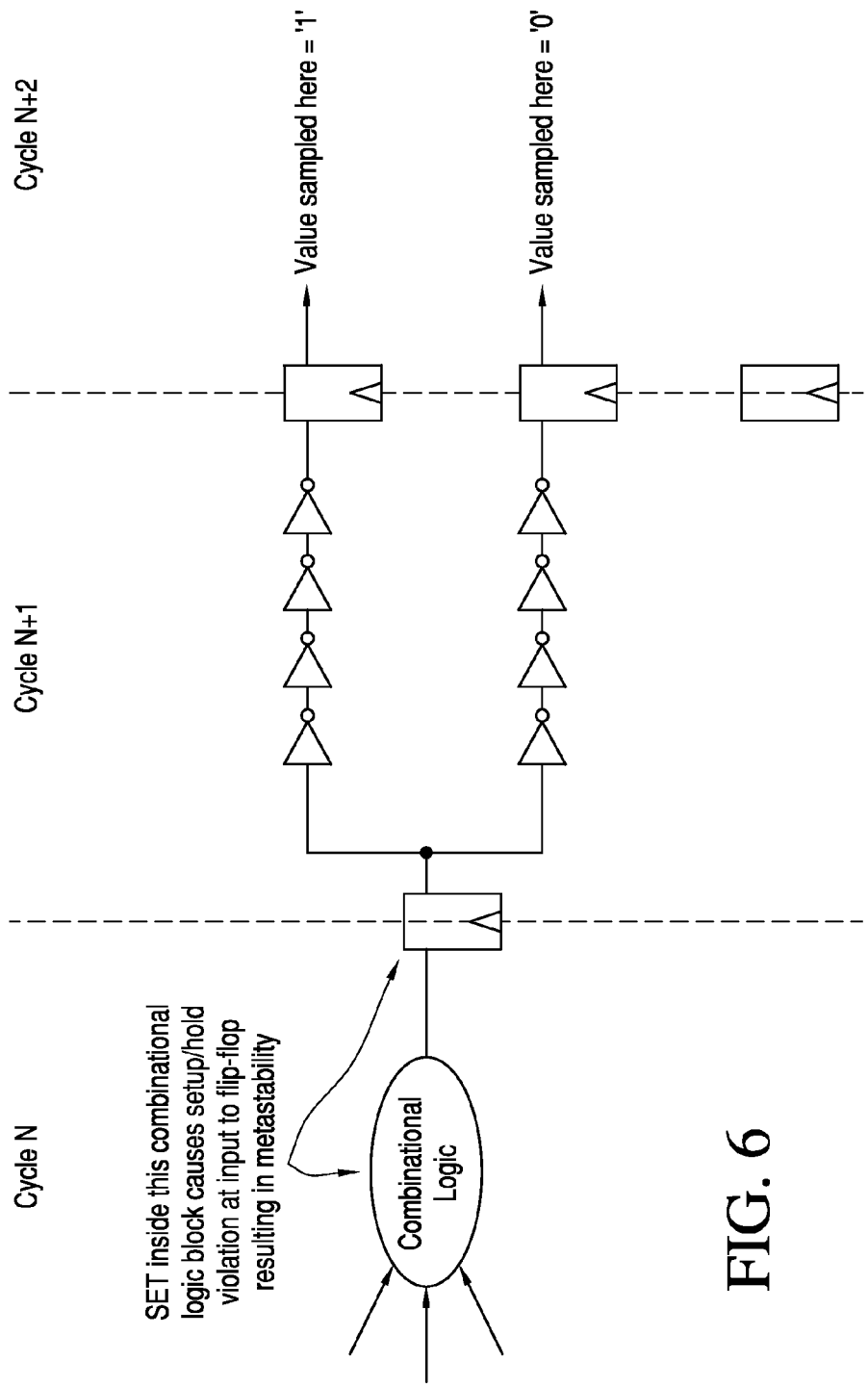
FIG. 6 illustrates the problem of different circuit sensitivities due to single event effects and metastability.

For example, in the situation described above, i.e., the flip-flop state is made metastable by an SET, if the metastable state resolves itself to the correct value late in cycle N+1, the short path dual redundant checking logic may have sufficient time to see a dual redundant match before the next clock edge whereas the long path combinational logic may not. The end result is that the error goes undetected in cycle N+1, and is not caught until cycle N+2. As long as this occurs within the speculative portion of the pipeline, the delayed error catching is not a problem. However, when transitioning to architectural state, it is imperative to catch the error in the same cycle that it occurs, or be able to back out from the corrupted state far enough back in time to restore the machine to a known good state where a restart is possible. Another example illustrating the problem of different circuit sensitivities is shown in FIG. 6. Again, an SET causes a transient pulse inside the combinational logic block in cycle N resulting in a setup/hold violation at the flip-flop driven by the combinational logic. This may result in a metastable state at the flip-flop output in cycle N+1. This output then feeds into two separate paths, each of which interprets the metastable state differently.

The approach taken in this design to account for the above issues is two-fold:

1. In the cycle in which the architectural state is updated, dual redundant checking is not performed directly on the output of state elements. Instead, it is done further downstream after the signal has gone through some number of gates. Passing through multiple gates with a large gain at each stage in the switching region makes the probability higher that the output of the stage that is checked will be driven to a solid '1' or '0', as opposed to the metastable state propagating to the output of this stage. The output of this stage must drive both the error detection logic and the actual circuit that uses it to ensure that both see the same value. This addresses the issue of different circuit sensitivities where the checking circuit sees a metastable state as a logic '1' and the actual circuit that uses the signal sees the same metastable state as a logic '0' (or vice-versa) due to different paths being taken to each circuit directly from the output of the state element.

2. Additionally, to account for different path delays, the delay of the path through the dual redundant checking logic must be designed to be the same as the delay of the path through the actual circuit that uses it (skilled designers will recognize that the delays may differ due to manufacturing variations even if they are identical paths in the design).

With respect to item 2 above, the delay of the path through the dual redundant checking logic should be the same as the delay of the path through the actual circuit that uses it for the following two reasons:

1. Assume that the output from a metastable state element drives some logic cone, and the output of that cone (referred to as signal 'A') is used to drive both the dual redundant checking logic and the circuit that uses it. Further assume that signal A is initially seen with the correct value, but subsequently switches to the incorrect value late in the cycle due to the metastability resolving itself the wrong way. In this case, we would want to either sample signal A in the error checking logic either at the same time or later than the circuit using it, in order to guarantee that the error is detected whereby the incorrect data made it to the circuit in time for the next sampling edge.

2. If signal A is initially seen incorrectly, but subsequently switches to the correct value late in the cycle, we would want to either sample signal A in the error checking logic either at the same time or earlier than the circuit using it, in order to guarantee that the error is detected whereby the correct data did not make it in time to the circuit for the next sampling edge.

Since we have a case where we would want to both sample early and sample late, or sample at the same time, to satisfy both cases above, the delay of the path through the dual redundant checking logic should be made approximately the same as the delay of the path through the actual circuit that uses it.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present disclosure. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosure includes any other applications in which embodiment of the above structures and fabrication methods are used. The scope of the embodiments of the present disclosure should be determined with reference to claims associated with these embodiments, along with the full scope of equivalents to which such claims are entitled.

The disclosure herein has been described with reference to specific embodiments, but various changes may be made without departing from the spirit or scope of the present disclosure. Various examples of such changes have been given in the foregoing description. Considering the different examples and embodiments described above, the disclosure herein can permit or provide for greater hardening of related circuitry against radiation-induced effects.

Accordingly, the disclosure of embodiments herein is intended to be illustrative of the scope of the application and is not intended to be limiting. It is intended that the scope of this application shall be limited only to the extent required by the appended claims. Therefore, the detailed description of the drawings, and the drawings themselves, disclose at least one preferred embodiment of the present invention, and may disclose other embodiments thereof.

All elements claimed in any particular claim are essential to the circuit and/or method claimed in that particular claim. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims. Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A processor comprising:
a dual-redundant speculative pipeline stage configured to generate dual-redundant outputs;
a dual-to-triple-redundant crossover configured to:
generate triple-redundant inputs from the dual-redundant outputs; and
detect whether a mismatch between the triple-redundant inputs is a result of the dual-redundant outputs being mismatched; and
a triple-redundant architectural state storage unit configured to store the triple-redundant inputs from the dual-to-triple redundant crossover.

2. The processor of claim 1, wherein:
the processor is selected from a group consisting of:
a digital signal processor, a microcontroller, or a microprocessor.

3. The processor of claim 1, wherein:
the processor operates at an operating speed of at least approximately 250 megahertz.

4. The processor of claim 1, further comprising:
an instruction pipeline comprising a single-instance pipeline portion configured to generate a single-instance output, a dual-redundant pipeline portion that includes the dual-redundant speculative pipeline stage and is configured to receive dual-redundant inputs, and a triple-redundant pipeline portion that includes the triple-redundant architectural state storage unit, wherein the dual-to-triple redundant crossover is connected between the dual-redundant pipeline portion and the triple-redundant pipeline portion; and
a single-to-dual crossover connected between the single-instance pipeline portion and the dual-redundant pipeline portion, wherein the single-to-dual crossover is configured to generate the dual-redundant inputs from the single-instance output.

5. The processor of claim 4, further comprising:
a datapath configured to interconnect the single-instance pipeline portion, the dual-redundant pipeline portion, and the triple-redundant pipeline portion;
wherein:
the datapath comprises:
an access datapath to access the processor; and
an internal processor datapath coupled between at least the triple-redundant pipeline portion and the dual-redundant pipeline portion;
the access datapath comprises a triple-redundant datapath; and
the internal processor datapath comprises a dual-redundant datapath.

6. The processor of claim 5, wherein:
the processor is configured to flush and restart the instruction pipeline when the mismatch is detected.

7. The processor of claim 6, wherein:
the instruction pipeline includes a writeback stage, the writeback stage including the dual-to-triple redundant crossover, wherein the dual-to-triple redundant crossover is configured so as to prevent the triple-redundant architectural state storage unit from receiving the triple-redundant inputs when the mismatch is detected to be the result of the dual-redundant outputs being mismatched.

8. The processor of claim 6, wherein the instruction pipeline comprises:
front stages where instructions are started down the instruction pipeline;
a writeback stage;
a front-end program counter corresponding to the front stages; and
a back-end program counter corresponding to the writeback stage, wherein the back-end program counter is triple-redundant.

9. The processor of claim 4, further comprising:
a first clock network comprising:
one or more dual-redundant clocks for the dual-redundant pipeline portion; and
one or more triple-redundant clocks for the triple-redundant pipeline portion.

10. The processor of claim 1, further comprising:
a single-instance data cache memory comprising:
a data cache storage array that includes a data storage array and a data address tag storage array; and
a write through cache.

11. The processor of claim 10, further comprising:
a single-instance instruction cache storage array that includes an instruction storage array and an instruction address tag storage array.

12. The processor of claim 11, further comprising:
an instruction pipeline comprising a single-instance pipeline portion that includes the single-instance data cache memory and the single-instance instruction cache storage array, a dual-redundant pipeline portion comprising a plurality of dual-redundant speculative pipeline stages, the plurality of dual-redundant speculative pipeline stages including the dual-redundant speculative pipeline stage, and a triple-redundant pipeline portion that includes the triple-redundant architectural state storage unit, wherein the dual-to-triple redundant crossover is connected between the dual-redundant pipeline portion and the triple-redundant pipeline portion;
a triple-redundant access datapath configured to provide access to the processor; and
an internal dual-redundant processor datapath coupled between the single-instance pipeline portion, the dual-redundant pipeline portion, and the triple-redundant pipeline portion; and
wherein the processor is coupled to a single-instance external bus.

13. The processor of claim 12, further comprising:
the triple-redundant pipeline portion comprising:
a triple-redundant write buffer coupled to the single-instance external bus via the triple-redundant access datapath;
a triple-redundant data cache unit (DCU) buffer that includes the triple-redundant architectural state storage unit, wherein the triple-redundant DCU buffer is coupled to at least one of:
the single-instance data cache memory via the internal dual-redundant processor datapath; or
the single-instance external bus via the triple-redundant access datapath; and
a triple-redundant instruction fetch unit (IFU) buffer coupled to at least one of:
the single-instance instruction cache storage array via the internal dual-redundant processor datapath; or
the single-instance external bus via the triple-redundant access datapath.

14. The processor of claim 12, wherein the dual-redundant pipeline portion further comprises:
a dual-redundant instruction decoder coupled to the single-instance instruction cache storage array via the internal dual-redundant processor datapath; and a dual-redundant register file coupled to the single-instance instruction cache storage array via the internal dual-redundant processor datapath.

15. The processor of claim 12, wherein the triple-redundant pipeline portion further comprises:
one or more triple-redundant architectural registers wherein one of the triple-redundant architectural registers includes the triple-redundant architectural state storage unit, the one or more triple-redundant architectural registers being coupled via the internal dual-redundant processor datapath to at least one of:
the single-instance instruction cache storage array;
the single-instance data cache memory;
a dual-redundant register file; or
a dual-redundant primary translation lookaside buffer (TLB).

16. The processor of claim 12, wherein the triple-redundant pipeline portion further comprises:
a triple-redundant write buffer that includes the triple-redundant architectural state storage unit;
one or more triple-redundant data cache unit (DCU) buffers;
one or more triple-redundant instruction fetch unit (IFU) buffers;
one or more triple-redundant architectural registers; and
one or more triple-redundant multiply-accumulate (MAC) registers; and
the dual-redundant pipeline portion further comprises:
a dual-redundant instruction decoder;
a dual-redundant register file;
a dual-redundant multiply-divide (MDU) unit; and
a dual-redundant primary translation lookaside buffer (TLB);
wherein:
the triple-redundant write buffer, the one or more triple-redundant DCU buffers, the one or more triple-redundant IFU buffers, and the one or more triple-redundant architectural registers are each coupled to the single-instance external bus via the triple-redundant access datapath;
the dual-redundant TLB is coupled via the internal dual-redundant processor datapath to the one or more triple-redundant architectural registers;
the single-instance instruction cache storage array is coupled via the internal dual-redundant processor datapath to the dual-redundant instruction decoder and the dual-redundant register file; and
the one or more triple-redundant MAC registers are coupled to the dual-redundant MDU unit via the internal dual-redundant processor datapath.

17. The processor of claim 1, wherein the processor is a radiation-hardened-by-design (RHBD) processor.

18. The processor of claim 11, further comprising:
an instruction pipeline comprising a single-instance pipeline portion that includes the single-instance data cache memory and the single-instance instruction cache storage array, a dual-redundant pipeline portion comprising a plurality of dual-redundant speculative pipeline stages, the plurality of dual-redundant speculative pipeline stages including the dual-redundant speculative pipeline stage, and a triple-redundant pipeline portion that includes the triple-redundant architectural state storage unit, wherein the dual-to-triple redundant crossover is connected between the dual-redundant pipeline portion and the triple-redundant pipeline portion;
a triple-redundant access datapath configured to provide access to the processor;
an internal dual-redundant processor datapath coupled between the single-instance pipeline portion, the dual-redundant pipeline portion, and the triple-redundant pipeline portion; and
wherein the processor is coupled to a triple-redundant external bus.

19. The processor of claim 14, wherein the single-instance instruction cache storage array is configured to access the dual-redundant register file using one of the dual-redundant outputs and to check access using another one of the dual-redundant outputs.

20. The processor of claim 16, wherein the dual-redundant pipeline portion further comprises a dual-redundant integer execution (IEU) unit, and wherein:
the one or more triple-redundant DCU buffers are at least one of:
coupled to the data cache storage array via the internal dual-redundant processor datapath; or
coupled to the single-instance external bus via the triple-redundant access datapath;
the one or more triple-redundant IFU buffers are at least one of:
coupled to the instruction storage array via the internal dual-redundant processor datapath; or
coupled to the external bus via the triple-redundant access datapath;
the one or more triple-redundant architectural registers are coupled via the internal dual-redundant processor datapath to at least one of the single-instance instruction cache storage array, the single-instance data cache memory, the dual-redundant register file, and the dual-redundant TLB;
the dual-redundant IEU unit is coupled, via the internal dual-redundant processor datapath, to at least one of
the dual-redundant instruction decoder;
the dual-redundant register file; or
the one or more triple-redundant architectural registers; and
the dual-redundant MDU unit is coupled, via the internal dual-redundant processor datapath, to at least one of:
the dual-redundant instruction decoder; or
the dual-redundant register file.

21. A processor comprising:
a dual-redundant circuit configured to generate dual-redundant outputs;
a triple-redundant circuit configured to store triple-redundant inputs; and
a dual-to-triple-redundant crossover coupled between the dual-redundant circuit and the triple-redundant circuit and configured to generate the triple-redundant inputs from the dual-redundant outputs, wherein the dual-to-triple-redundant crossover comprises a mismatch checker configured to detect whether a mismatch between the triple-redundant inputs is a result of the dual-redundant outputs being mismatched.

22. The processor of claim 21, wherein:
the dual-to-triple-redundant crossover comprises:
a first input node configured to receive a first output of the dual-redundant outputs from the dual-redundant circuit;
a second input node configured to receive a second output of the dual-redundant outputs from the dual-redundant circuit;
a first output node configured to provide a first input of the triple-redundant inputs;
a second output node configured to provide a second input of the triple-redundant inputs; and a third output node configured to provide a third input of the triple-redundant inputs;

wherein the dual-to-triple-redundant crossover is configured to generate the triple-redundant inputs from the dual-redundant outputs by:

generating the first input of the triple-redundant inputs based on the first output of the dual-redundant outputs;

generating the second input of the triple-redundant inputs based on the second output of the dual-redundant outputs; and generating the third input of the triple-redundant inputs based on the second output of the dual-redundant outputs.

23. The processor of claim 22, wherein the mismatch checker comprises:

an XOR circuit coupled to receive the first input of the triple-redundant inputs from the first output node and to receive the second input of the triple-redundant inputs from the second output node, wherein the XOR circuit is configured to perform an XOR operation on the first input and the second input so as to generate an XOR output;

an XNOR circuit coupled to receive the second input of the triple-redundant inputs from the second output node and to receive the third input of the triple-redundant inputs from the third output node, wherein the XNOR circuit is configured to perform an XNOR operation on the second input and the third input so as to generate an XNOR output; and an AND circuit coupled to receive the XOR output from the XOR circuit and the XNOR output from the XNOR circuit, wherein the AND circuit is configured to perform an AND operation on the XOR output and the XNOR output so as to generate an AND output, the AND output being indicative of when the mismatch is detected to be the result of the dual-redundant outputs being mismatched in response to both the XOR output and XNOR output being asserted.

24. The processor of claim 23, further comprising:

an instruction pipeline comprising the dual-redundant circuit and the triple-redundant circuit, wherein the AND output is an abort output;

wherein the processor is configured to abort and restart the instruction pipeline in response to the abort output being indicative that the mismatch is detected to be the result of the dual-redundant outputs being mismatched.

25. The processor of claim 23, wherein the dual-to-triple-redundant crossover further comprises:

a first voting circuit coupled to receive the first input from the first output node, to receive the second input from the second output node, and to receive the third input from the third output node, wherein the first voting circuit is configured to correct the first input to a majority bit state of the first input, the second input, and the third input and then pass the first input to the triple-redundant circuit;

a second voting circuit coupled to receive the first input from the first output node, to receive the second input from the second output node, and to receive the third input from the third output node, wherein the second voting circuit is configured to correct the second input to a majority bit state of the first input, the second input, and the third input and then pass the second input to the triple-redundant circuit; and a third voting circuit coupled to receive the first input from the first output node, to receive the second input from the second output node, and to receive the third input from the third output node, wherein the third voting circuit is configured to correct the third input to a majority bit state of the first input, the second input, and the third input and then pass the third input to the triple-redundant circuit.

26. A method comprising:

generating first and second dual-redundant outputs with a dual-redundant circuit;

generating first, second, and third triple-redundant inputs from the first and second dual-redundant outputs using a crossover coupled between the dual-redundant circuit and a triple-redundant circuit; and detecting whether there is a mismatch between the first and second dual-redundant outputs based on the first, second, and third triple-redundant inputs using a mismatch checker.

27. The method of claim 26, wherein:

generating the first, second, and third triple-redundant inputs from the first and second dual-redundant outputs comprises:

receiving the first dual-redundant output from the dual-redundant circuit at a first input node of the crossover;

receiving the second dual-redundant output from the dual-redundant circuit at a second input node of the crossover;

generating the first triple-redundant input at a first output node of the crossover based on the first dual-redundant output from the first input node;

generating the second triple-redundant input at a second output node of the crossover based on the second dual-redundant from the second input node; and generating the third triple-redundant input at a third output node of the crossover based on the second dual-redundant output from the second input node; and detecting whether there is the mismatch between the first and second dual-redundant outputs based on the first, second, and third triple-redundant inputs using the mismatch checker comprises:

detecting whether the first triple-redundant input mismatches the second triple-redundant input with the mismatch checker; while detecting whether the second triple-redundant input matches the third triple-redundant input with the mismatch checker.

28. The method of claim 26, further comprising:

restarting an instruction pipeline when the mismatch is detected, wherein the instruction pipeline includes the dual-redundant circuit and the triple-redundant circuit.

29. The method of claim 28, wherein restarting the instruction pipeline when the mismatch is detected comprises restarting execution by the instruction pipeline of a last speculative instruction.

30. The method of claim 29, wherein restarting execution by the instruction pipeline of a last speculative instruction comprises:

obtaining an execution vector that is indicative of the last speculative instruction at an execution handler;

processing the execution vector with the execution handler; and using the execution handler to cause the instruction pipeline to restart execution of the last speculative instruction.

31. The method of claim 30, further comprising restoring a dual-redundant register file state storage.

32. The method of claim 27, further comprising:
correcting the first triple-redundant input to a majority bit state of the first triple-redundant input, the second triple-redundant input, and the third triple-redundant input;
after the first triple-redundant input is corrected, transmitting the first triple-redundant input to a first input node of the triple-redundant circuit when the mismatch is not detected;
correcting the second triple-redundant input to a majority bit state of the first triple-redundant input, the second triple-redundant input, and the third triple-redundant input;
after the second triple-redundant input is corrected, transmitting the second triple-redundant input to a second input node of the triple-redundant circuit when the mismatch is not detected;
correcting the third triple-redundant input to a majority bit state of the first triple-redundant input, the second triple-redundant input, and the third triple-redundant input; and
after the third triple-redundant input is corrected, transmitting the third triple-redundant input to a third input node of the triple-redundant circuit when the mismatch is not detected.

33. A processor comprising:
an execution pipeline comprising:
one or more execution stages comprising a final execution stage; and
a program counter backup stage subsequent to the final execution stage; wherein:
the final execution stage comprises a final program counter for a final instruction address;
the program counter backup stage comprises a backup program counter for a backup instruction address;
the final instruction address is configured to address a final instruction that is in the final execution stage during a current cycle; and
the backup instruction address is configured to address a retired instruction that was in the final execution stage during a previous cycle immediately precedent to the current cycle.

34. The processor of claim 33, wherein:
the execution pipeline comprises:
a restart address selector at the program counter backup stage; and
the restart address selector is configured to output a restart address comprising one of:
the final instruction address when the final instruction comprises a non-branch-delay-slot instruction; or
the backup instruction address when the final instruction comprises a branch-delay-slot instruction.

35. The processor of claim 34, wherein:
the processor is configured to:
detect a soft error on the final instruction; and
restart the execution pipeline with the restart address when the soft error is detected.

36. The processor of claim 35, wherein:
the execution pipeline comprises:
a front-end stage of the one or more execution stages;
a front-end program counter of the front-end stage; and
a next-program-counter logic circuit coupled to the restart address selector to receive the restart address; and
the next-program-counter logic circuit is configured to:
provide the restart address to the front-end program counter when the soft error is detected.

37. A method for providing a processor, the method comprising:
providing an execution pipeline of the processor, comprising:
providing a final execution stage;
providing a program counter backup stage subsequent to the final execution stage; and
providing a restart address selector to select, as a source of a restart address for the execution pipeline, one of:
a final program counter of the final execution stage; or
a backup program counter of the backup stage.

38. The method of claim 37, wherein providing the execution pipeline further comprises:
providing a pipeline restart control circuit to restart the execution pipeline with the restart address when an error is detected in a final instruction at the final execution stage.

39. The method of claim 37, wherein:
providing the restart address selector comprises:
providing the restart address selector to select:
the final program counter as the source of the restart address when a final instruction at the final execution stage comprises a non-branch-delay-slot instruction; or
the backup program counter as the source of the restart address when the final instruction at the final execution stage comprises a branch-delay-slot instruction.

* * * * *